United States Patent
Murray et al.

(10) Patent No.: US 10,191,275 B1
(45) Date of Patent: Jan. 29, 2019

(54) THREE-MIRROR ANASTIGMAT HAVING RECTANGULAR APERTURE STOP

(71) Applicant: BAE SYSTEMS Information and Electronic Systems Integration Inc., Nashua, NH (US)

(72) Inventors: Ian B. Murray, Amherst, NH (US); David Ericson, Smithtown, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 18 days.

(21) Appl. No.: 15/643,158

(22) Filed: Jul. 6, 2017

(51) Int. Cl.
| | |
|---|---|
| G02B 27/00 | (2006.01) |
| G02B 17/00 | (2006.01) |
| G01J 3/02 | (2006.01) |
| G01J 1/04 | (2006.01) |
| G01J 3/14 | (2006.01) |
| G01J 3/18 | (2006.01) |

(52) U.S. Cl.
CPC ........ *G02B 27/0025* (2013.01); *G01J 1/0411* (2013.01); *G01J 3/0208* (2013.01); *G02B 17/004* (2013.01); *G01J 3/14* (2013.01); *G01J 3/18* (2013.01)

(58) Field of Classification Search
CPC . G02B 27/0025; G02B 17/004; G01J 1/0411; G01J 3/0208; G01J 3/14; G01J 3/18
USPC .......................................................... 356/328
See application file for complete search history.

(56) References Cited

U.S. PATENT DOCUMENTS

| | | | |
|---|---|---|---|
| 4,331,390 A | 5/1982 | Shafer | |
| 2008/0151364 A1* | 6/2008 | Shafer | G02B 17/0812 359/365 |
| 2009/0009897 A1* | 1/2009 | Holota | G02B 17/0657 359/859 |
| 2010/0238440 A1* | 9/2010 | Oskotsky | G01J 3/02 356/328 |
| 2016/0341948 A1* | 11/2016 | Tetaz | G02B 23/06 |
| 2017/0299855 A1* | 10/2017 | Squires | G02B 17/08 |

FOREIGN PATENT DOCUMENTS

CN 103149687 A 6/2013

\* cited by examiner

*Primary Examiner* — Hina F Ayub
(74) *Attorney, Agent, or Firm* — Finch & Maloney PLLC (57) ABSTRACT

An off-axis optical system having a rectangular aperture stop to control rays of incident electromagnetic radiation passing through the optical system along an optical path is provided. The optical system includes one or more optical surfaces along the optical path, each surface being configured to change a direction of each ray on the surface based on a location of the ray relative to the surface. At least one of the surfaces is conjugate to and has the same shape as the rectangular aperture stop. In one embodiment, each optical surface is shaped to avoid vignetting the rays. In one embodiment, the optical system is a three-mirror anastigmat (TMA) and includes a concave primary mirror to collect and focus the electromagnetic radiation; a curved secondary mirror to reflect the electromagnetic radiation focused by the primary mirror; and a concave tertiary mirror to focus the electromagnetic radiation reflected by the secondary mirror.

14 Claims, 10 Drawing Sheets

Three-Mirror Anastigmat (TMA) 100

THREE-MIRROR ANASTIGMAT HAVING RECTANGULAR APERTURE STOP

BACKGROUND

In many remote sensing applications, such as observation, surveillance, and reconnaissance, there is a need for better object space resolution, such as improved ground sampled distance (GSD), and without increasing the system package size. For example, multi-band systems that include spectrometers can benefit from improving the object space resolution. Improved object space resolution provides more information to the end user, such as when resolving between stars in an extraterrestrial-viewing system (e.g., an astronomical telescope observing the sky) or when resolving between objects on the ground. For instance, in digital imagery of the ground captured from an airborne platform (such as a digital photo captured by an airborne surveillance system or satellite), GSD refers to the distance between pixels measured on the ground. So, for example, for an image having a GSD of 1 meter, adjacent pixels of the image correspond to locations on the ground that are 1 meter apart. An example of an off-axis reflective system is a three-mirror anastigmat (TMA), which is an optical instrument (e.g., telescope) having three mirrors to correct for spherical aberration, coma, and astigmatism.

BRIEF DESCRIPTION OF THE DRAWINGS

Features of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those in light of the present disclosure.

DETAILED DESCRIPTION

In an embodiment of the present disclosure, a three-mirror anastigmat (TMA) is disclosed as an example of an off-axis reflective optical device having a non-circular (e.g., rectangular) aperture stop. The TMA includes: a concave primary mirror to collect and focus electromagnetic radiation; a curved secondary mirror to reflect the electromagnetic radiation focused by the primary mirror; and a concave tertiary mirror to focus the electromagnetic radiation reflected by the secondary mirror. The TMA has a non-circular aperture stop. In one embodiment, the primary mirror defines (for example, is conjugate to) the aperture stop, A non-circular aperture stop can thus be defined by a non-circular primary mirror that captures more signal energy than a circular primary mirror. For example, the system package size might permit a rectangular primary mirror, which can capture more incoming light than an equivalently constrained circular primary mirror.

An optical path through the TMA as defined by the non-circular aperture stop is unobscured by the secondary and tertiary mirrors. In an embodiment, the secondary mirror is convex. In some such embodiments, the TMA further includes a fold mirror to reflect the electromagnetic radiation reflected by the secondary mirror to the tertiary mirror. In an embodiment, the optical path is unobscured by the fold mirror. In an embodiment, the primary mirror is rectangular. In an embodiment, the aperture stop is rectangular. In an embodiment, the primary mirror defines (or is conjugate to) the aperture stop. In still other embodiments, a remote sensing device includes the TMA and an optical sensor to sense the focused electromagnetic radiation from the tertiary mirror.

It should be noted that the TMA is one example of an off-axis reflective optical device. In some embodiments of the present disclosure, an off-axis optical system (e.g., an optical system in which the aperture's optical axis does not coincide with the aperture's mechanical center) having a non-circular aperture stop is provided. The system includes one or more optical surfaces (e.g., refractive or reflective components such as lenses, mirrors, partially reflecting lenses or mirrors, semi-transparent mirrors, to name a few) that are capable of variably changing the direction of light incident on the surface based on the location of each ray relative to the surface. For example, the surfaces can be reflective, transmissive, or both reflective and transmissive. The rays (e.g., electromagnetic rays, such as light) passing through the optical system are controlled (e.g., limited) by an aperture stop. The aperture stop is non-circular. For example, in some embodiments, the aperture stop is rotationally symmetric (about any axis of rotation) at no more than four different positions (e.g., not a regular pentagon, since that polygon is rotationally symmetric about its center at five different positions, but could be a square). In some other embodiments, the aperture stop is rotationally symmetric at no more than two different positions (e.g., not a square or equilateral triangle, but could be a rectangle having a longer length than width).

Numerous TMA-based (or other off-axis optical system) configurations and numerous imaging or other remote sensing applications, including observation, surveillance, and reconnaissance, will be apparent in light of this disclosure. However, for ease of description, much of the disclosure is directed to TMA-based airborne systems intended for surveillance and reconnaissance of the ground.

General Overview

A TMA provides a telescope that corrects for aberrations inherent in other telescope designs, such as chromatic aberration, spherical aberration, coma, and astigmatism. Such an instrument can be useful in many optical sensor roles, such as surveillance and reconnaissance. Telescopes are usually built around circular (such as spherical) lenses and mirrors to lessen or minimize technical complexity and cost of design, fabrication, and assembly. These circular components, in turn, usually require circular aperture stops to avoid effects such as vignetting the corresponding optical paths through the telescopes.

Thus, and in accordance with an embodiment, an unobscured TMA having a rotationally asymmetric aperture stop (such as being rotationally symmetric about an axis of rotation in no more than two locations, as with a rectangular aperture stop having a longer length than width) to increase or maximize light collection is provided. Such a design improves the TMA. For example, such a design increases the light (or other electromagnetic radiation) collecting area, which can decrease the f-number and improve aspects such as GSD and without violating existing system envelopes or package size constraints. Instead of, or in addition to, such a design can maintain the same collecting area by decreasing the size of the optical system, allowing a smaller overall volume to reduce aspects such as size, weight, power, and cost of the overall system. These designs are applicable, for example, to any system that uses a front-end telescope. Such techniques increase the light collection area and GSD compared to other unobscured, off-axis telescope designs fitting in the same envelope and while maintaining or improving optical requirements like f-number, focal length, and imaging performance.

An additional feature of a TMA according to one or more embodiments is that the component costs are comparable to the other designs since, for example, the rectangular primary mirror (the principal cost) can be cut from the same rectangular mirror blank used to produce a circular primary mirror in the same envelope. Further, the fabrication cost from the blank is similar for the two since while the rectangular primary mirror needs a little more grinding and polishing, it also needs less edging than the circular primary mirror. Embodiments of the present disclosure can benefit any optical system for which a non-circular aperture can be applied to reduce size, weight, and power.

In one or more embodiments of the present disclosure, a three-mirror anastigmat optical instrument (such as a telescope or spectrometer) is used in conjunction with a rectangular aperture stop. The three-mirror design can eliminate optical distortions such as spherical aberration, coma, and astigmatism. The rectangular aperture stop can produce larger collector areas in the same package sizes as circular primary mirror devices. One or more embodiments of the present disclosure improve GSD and ground spot size (GSS) of multi-band reconnaissance systems (such as compact multi-band reconnaissance systems) by using rectangular aperture stops in the collecting telescope. In one or more embodiments, a TMA with a non-circular (such as rectangular) aperture stop having increased TMA collecting area (such as a larger primary mirror) is provided. The larger collecting area improves GSD and GSS by increasing the effective pupil diameter (EPD) of the TMA, which in turn lowers (improves) GSD and GSS compared to using circular mirrors in the same package.

Architecture and Methodology

Figure 1:
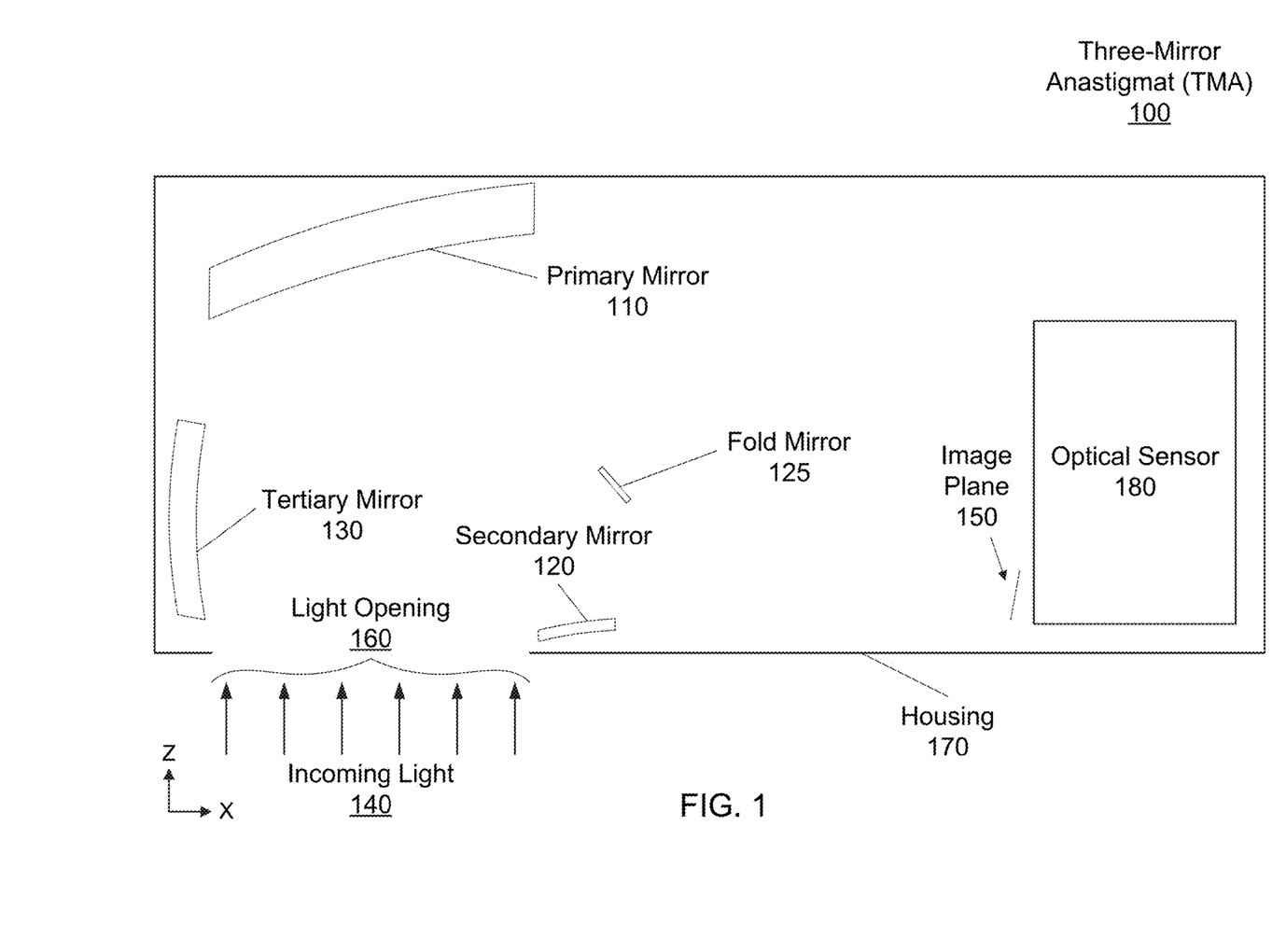
FIG. 1 is a cross-section view of an example TMA, configured according to an embodiment of the present disclosure.

FIG. 1 is a cross-section (X-Z) view of an example TMA 100, configured according to an embodiment of the present disclosure. For ease of description throughout, the TMA 100 will be described from the perspective of an airborne surveillance and reconnaissance sensor, sensing ground-based objects or scenes from the air. As such, the field of view of the TMA 100 is the ground, with the primary mirror facing mostly down (e.g., Z-direction). The TMA 100 also has a length (e.g., X-direction) and a depth or width (e.g., Y-direction). However, this assignment of directions is to enable easier description and orientation of the features and elements of the TMA 100, and other embodiments of the present disclosure are not so limited. For example, in another embodiment, the TMA 100 could be directed primarily to observing the horizon (e.g., parallel to the ground) or space (e.g., upwards).

The TMA 100 includes a housing 170 (such as a durable housing, like a housing made from metal) enclosing the optical components of the TMA 100. For example, the housing may be mostly cylindrical in shape, with similar dimensions (e.g., a diameter) in the Y- and Z-directions (e.g., depth and height), and a longer X-dimension (e.g., length). The housing 170 has an interior coated with a non-reflective coating to absorb stray light not on the optical path being sensed by the TMA 100. The housing 170 has a length (extending in the X-direction) and a width or depth (extending in the Y-direction normal to the X-Z plane illustrated in FIG. 1) less than the length. The housing 170 also has a height (extending in the Z-direction and of similar magnitude to the Y-direction).

The X- and Z-directions are asymmetrical directions, the TMA 100 being an off-axis design that increases or maximizes light collection, reduces or minimizes interference of the optical path by the different optical and mechanical components, and fits in as compact a package (or envelope) as possible or practical. The Y-direction, on the other hand, is the direction of symmetry. The principal driver of the housing (e.g., cylinder) diameter is the size of the primary mirror in the Y-direction (direction of symmetry). The distance between the primary mirror and the secondary mirror constrains the housing 170 (e.g., cylinder) diameter in the other (mostly Z-, but some X-) direction. In the TMA 100, the X- and Y-directions are the directions primarily associated with light collection, and the X- and Z-directions are the directions primarily associated with light focusing (optical path).

The housing 170 includes an off-axis light opening 160 for letting in external light 140 (or other electromagnetic radiation) to be sensed by the TMA 100. The light 140 enters the TMA 100 and is collected by a primary mirror 110. For example, the light 140 on the optical path of the TMA 100 (e.g., light eventually focused at or sensed by an optical sensor 180 of the TMA 100) first contacts the primary mirror 110 after entering through the opening 160. In order to provide as much magnification as possible, the TMA 100 has a very narrow field of view, limited first by the opening 160, and then further limited by a narrow optical path through the TMA 100. Any light that strays from this field of view is absorbed by non-reflective interior components (or surfaces), reflected out of the TMA 100 (e.g., out through the opening 160), or otherwise prevented from reaching image plane 150. For example, the curvature of the mirrors and angles they make with respect to each other is such that stray light does not make it to the image plane 150 along the optical path, but rather reflects to a non-optical path portion of the TMA 100.

The field of view is unobscured. Any light within the field of view of the telescope (as defined by the optical path and aperture stop) and directed to the light opening 160 travels freely through the optical path to the image plane 150, and without hitting any obstruction within the TMA 100 (such as the side or back of a mirror or other optical component). An unobscured optical path further increases the light collecting efficiency of the TMA 100.

The primary mirror 110 is a rectangular (or substantially rectangular, such as having slightly rounded corners) and concave (e.g., ellipsoid) mirror configured to focus light on the optical path (e.g., light within the field of view of the TMA 100 entering through the opening 160). The long side (or length) of the rectangular primary mirror 110 extends in the X-direction. The long side may be about 25% longer than the short side (or width). The primary mirror 110 may be fabricated from a material (e.g., metal, ceramic, or the like)

manufactured using a hot isostatic pressing (HIP) technique, such as a casting made from metal powders, or using computer-aided manufacturing (e.g., freeform surface machining) to precisely shape the primary mirror 110.

For instance, the casting can be made of AlBeMet (a beryllium and aluminum metal matrix composite material; AlBeMet is a registered trademark of Brush Wellman, Inc.). The casting can be plated by a thin layer of nickel (to smooth surface imperfections and provide a good bonding surface for silver) and then polished to precise dimensions to conform incoming light in the field of view to the optical path (e.g., by first focusing the light to a secondary mirror 120). A very thin coating of a metal such as silver (or gold, aluminum, or the like) can be adhered to the nickel plating to increase or maximize reflectivity of the surface of the primary mirror 110. In addition, a thin overcoat of a (transparent) air and moisture barrier can be applied to the silver (or other metal or reflective) coating to protect the reflecting surface from reacting to ambient air or water, but allow light (or other electromagnetic radiation) to reflect off the reflective coating. Light that reaches the primary mirror 110 from the field of view of the TMA 100 is reflected by (e.g., collected and focused by) the primary mirror 110 to the secondary mirror 120. By contrast, other light reaching the primary mirror 110 reflects off the primary mirror 110 but not in the direction of the secondary mirror, and so does not become part of the optical path.

The rectangular primary mirror 110 can define a rectangular aperture stop of the TMA 100. For example, the primary mirror 110 can present a rectangular cross-section in the plane normal to the optical path. For instance, in one or more embodiments, the rectangular primary mirror 110 has a width-to-length ratio of about 0.8 (e.g., between 0.78 and 0.82, or between 0.76 and 0.84), and defines a rectangular aperture stop of the same proportion. Further, under perfect reflection (of mirrors) and transmission (through transparent materials) along the optical path, all light in the field of view of the TMA 100 reaching the primary mirror 110 through the opening 160 also reaches the image plane 150 through the rectangular aperture stop. For example, the optical path is unobscured by mirrors or other structures or elements of the TMA 100 before reaching the image plane 150.

The rectangular primary mirror 110 is better able to take advantage of the longer X-dimension in the TMA 100 than a circular primary mirror (whose diameter is constrained by the shorter Z-dimension), allowing the total collecting area of the primary mirror 110 to grow without causing a corresponding increase in the Y- and Z-dimensions. This allows for a smaller pixel pitch (which reduces the GSD) and a lower f-number (which further reduces the GSD) compared to circular primary mirror TMA designs.

The secondary mirror 120 is a rectangular convex (e.g., hyperboloid) mirror configured to receive and reflect that portion of the light collected and focused by the primary mirror 110 that is on the optical path (e.g., in the field of view) of the TMA 100. For example, the secondary mirror 120 can be fabricated using the same or similar process as the primary mirror 110. Light that reaches the secondary mirror 120 on the optical path from the primary mirror 110 is reflected by (diverges away from) the secondary mirror 120 to a tertiary mirror 130, in this case by way of fold mirror 125. Only the reflecting surface of the secondary mirror 120 becomes part of the optical path. The other surfaces of the secondary mirror 120 do not obscure the optical path in any way.

Like the primary mirror 110, the secondary mirror 120 can be rectangular or substantially rectangular in shape, and can also define the rectangular aperture stop of the TMA 100. In some embodiments, the secondary mirror 120 is larger than the optical path (e.g., larger than the cross section of the optical path at the secondary mirror 120) and can have a non-rectangular shape. In some embodiments, the secondary mirror 120 is concave, and focuses its light to the tertiary mirror 130.

The fold mirror 125 is a rectangular flat mirror configured to bend the diverging light reflected by the secondary mirror 120 and direct the bent light to the tertiary mirror 130. The fold mirror 125 can be fabricated by the same or similar process as the primary mirror 110 and secondary mirror 120. Only the reflecting surface of the fold mirror 125 becomes part of the optical path. The other surfaces of the fold mirror 125 do not obscure the optical path in any way. Like the primary mirror 110 and the secondary mirror 120, the fold mirror 125 can be rectangular or substantially rectangular in shape, and can also define the rectangular aperture stop of the TMA 100. In some embodiments, the secondary mirror 120 is larger than the optical path (e.g., larger than the cross section of the optical path at the secondary mirror 120) and can have a non-rectangular shape. In some embodiments, the fold mirror 125 is not present, and the secondary mirror 120 reflects directly to the tertiary mirror 130. In some embodiments, the primary mirror 110 focuses to the fold mirror 125, which then directs the light to the secondary mirror 120. In some embodiments, there are two or more fold mirrors 125 to redirect the light in the optical path.

The tertiary mirror 130 is a rectangular concave (e.g., ellipsoid) mirror configured to receive and focus that portion of the light reflected by the fold mirror 125 that is on the optical path (e.g., in the field of view) of the TMA 100. For example, the tertiary mirror 130 can be fabricated using the same or similar process as the primary mirror 110 and secondary mirror 120. Light that reaches the tertiary mirror 130 on the optical path from the fold mirror 125 is reflected and focused to the image plane 150. Only the reflecting surface of the tertiary mirror 130 becomes part of the optical path. The other surfaces of the tertiary mirror 130 do not obscure the optical path in any way. Like the primary mirror 110 and the secondary mirror 120, the tertiary mirror 130 can be rectangular or substantially rectangular in shape, and can also define the rectangular aperture stop of the TMA 100. In some embodiments, the tertiary mirror 130 is larger than the optical path (e.g., larger than the cross section of the optical path at the tertiary mirror 130) and can have a non-rectangular shape.

Focused light on the optical path from the tertiary mirror 130 reaches the focal length of the TMA 100 at the image plane 150 (or focal plane or image space), which is connected to an optical sensor 180. For example, the optical sensor 180 can be a camera, such as a digital camera, and the image plane 150 can be the optical (such as visible or infrared) image in the field of view (e.g., object space) of the TMA 100. In another embodiment, the optical sensor 180 is a spectrometer, and the image plane 150 includes a dispersive element (such as a grating or prism) to disperse the focused image into a spectrum of electromagnetic wavelengths that are analyzed by the spectrometer to determine a distribution of each wavelength or wavelength range. In another embodiment, the optical sensor 180 is an eyepiece or image display possibly including one or more relay mirrors or optics to display the field of view as an optical image to a user.

In some embodiments, the TMA 100 has a rectangular primary mirror 110 defining a rectangular aperture stop and having an f-number of between 6.2 and 6.5, although in other embodiments the f-number can be as low as 2, or higher, up to and including the use of the TMA as an afocal beam reducer. For example, in one embodiment, the TMA 100 has an f-number of about 6.2 (for example, between 6.1 and 6.3, or between 6.0 and 6.4). In other embodiments, the TMA 100 has an f-number between 6.2 and 6.5. For instance, in one embodiment, the TMA 100 has a focal length of 85 inches, and the primary mirror 110 has a width of 10.8 inches and a length of 13.6 inches (for a width-to-length ratio of about 0.8) defining an equivalent entrance pupil diameter of 13.67 inches ($2 \times \sqrt{10.8 \times 13.6 \div \pi}$), for an f-number of 85/13.67=6.22. In another embodiment, the TMA 100 has a focal length of 85 inches, and the primary mirror 110 has a width of 10.4 inches and a length of 13 inches (for a width-to-length ratio of 0.8) defining an equivalent entrance pupil diameter of 13.12 inches ($2 \times \sqrt{10.4 \times 13 \div \pi}$), for an f-number of 85/13.12=6.48. This compares favorably to circular primary mirror designs which, even for comparable 12.7 and 12.0 inch entrance pupil diameters and the same 85 inch focal length yields f-numbers of 85/12.7=6.69 and 85/12=7.08.

FIGS. 2A-2E are cross-section (X-Z) views of example light ray paths in the field of view of the TMA 100 of FIG. 1, according to an embodiment of the present disclosure. For ease of illustration, only the four mirrors (primary mirror 110, secondary mirror 120, fold mirror 125, and tertiary mirror 130) and image plane 150 are illustrated in FIGS. 2A-2E. For further easy of illustration, only the X-dimension of the field of view is illustrated in FIGS. 2A-2E, the Y-dimension being held constant. In addition, entering light ray paths 190 in the field of view of the TMA 100 are also illustrated (entering from the source of incoming light 140). Each light ray in the field of view enters from the incoming light 140, reflects off the primary mirror 110, then off the secondary mirror 120, then off the fold mirror 125, then off the tertiary mirror 130, and then focuses on the image plane 150.

Figure 2A:
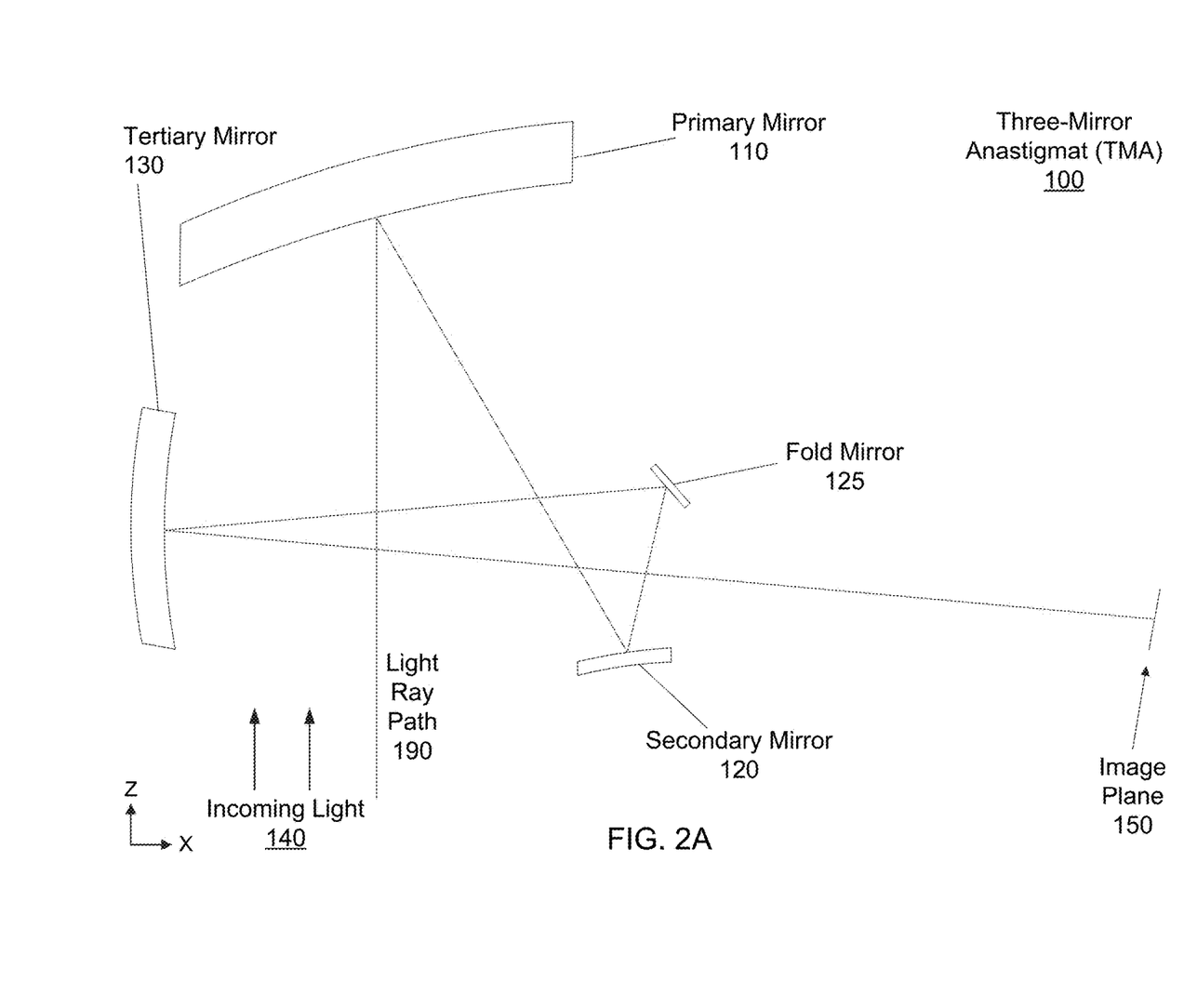
FIGS. 2A-2E are cross-section views of example light ray paths in the field of view of the TMA of FIG. 1, according to an embodiment of the present disclosure.
Figure 2B:
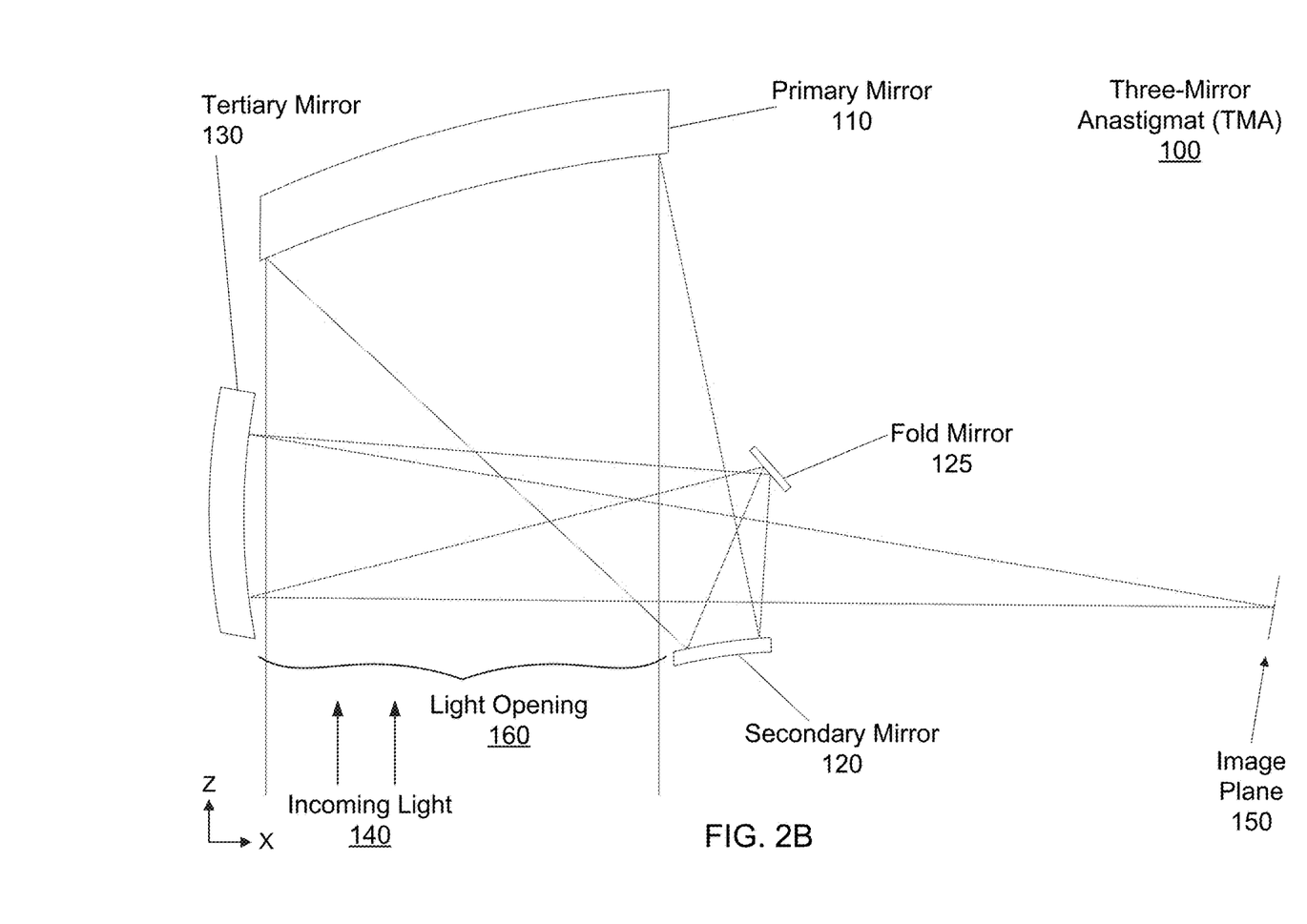
Figure 2C:
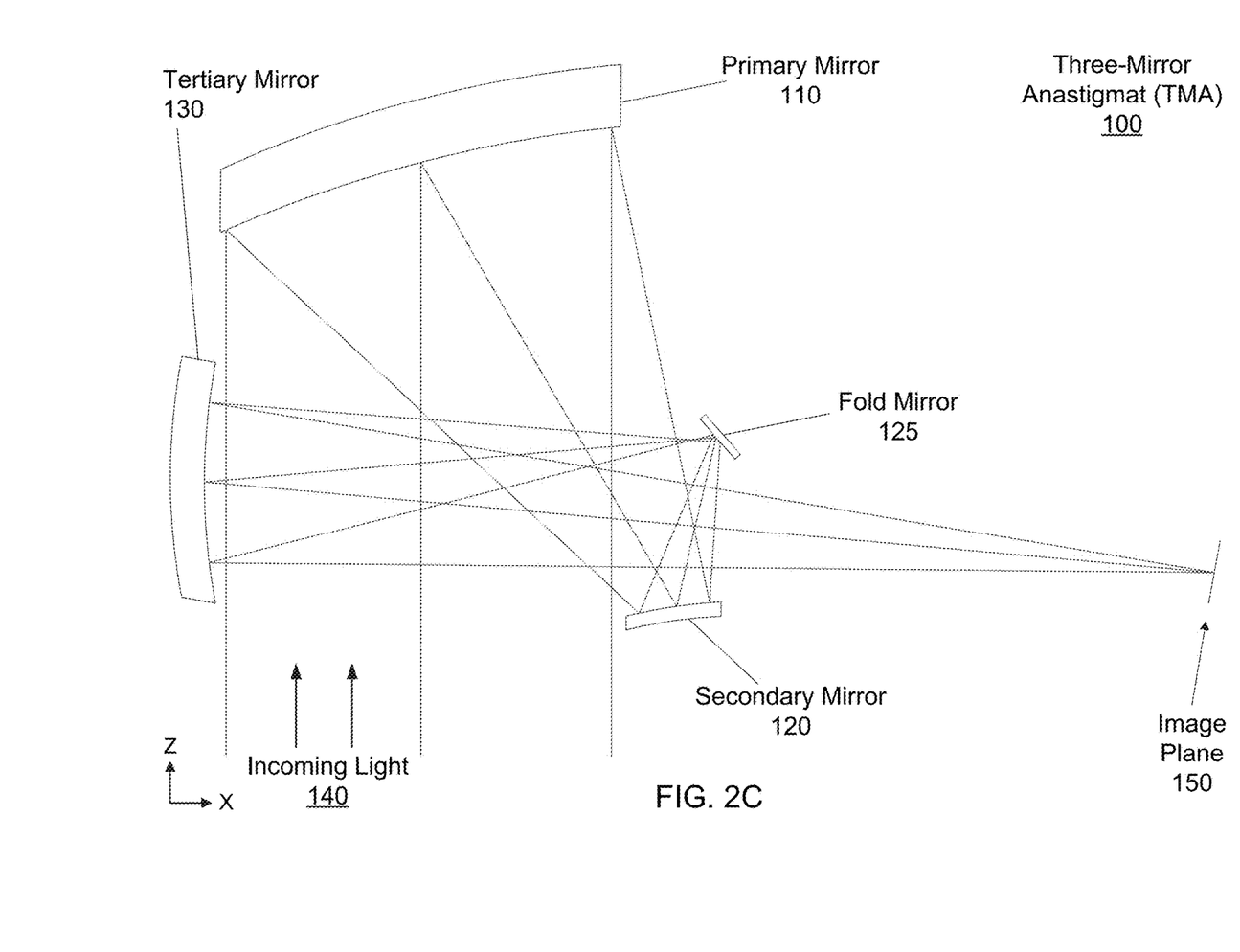
Figure 2D:
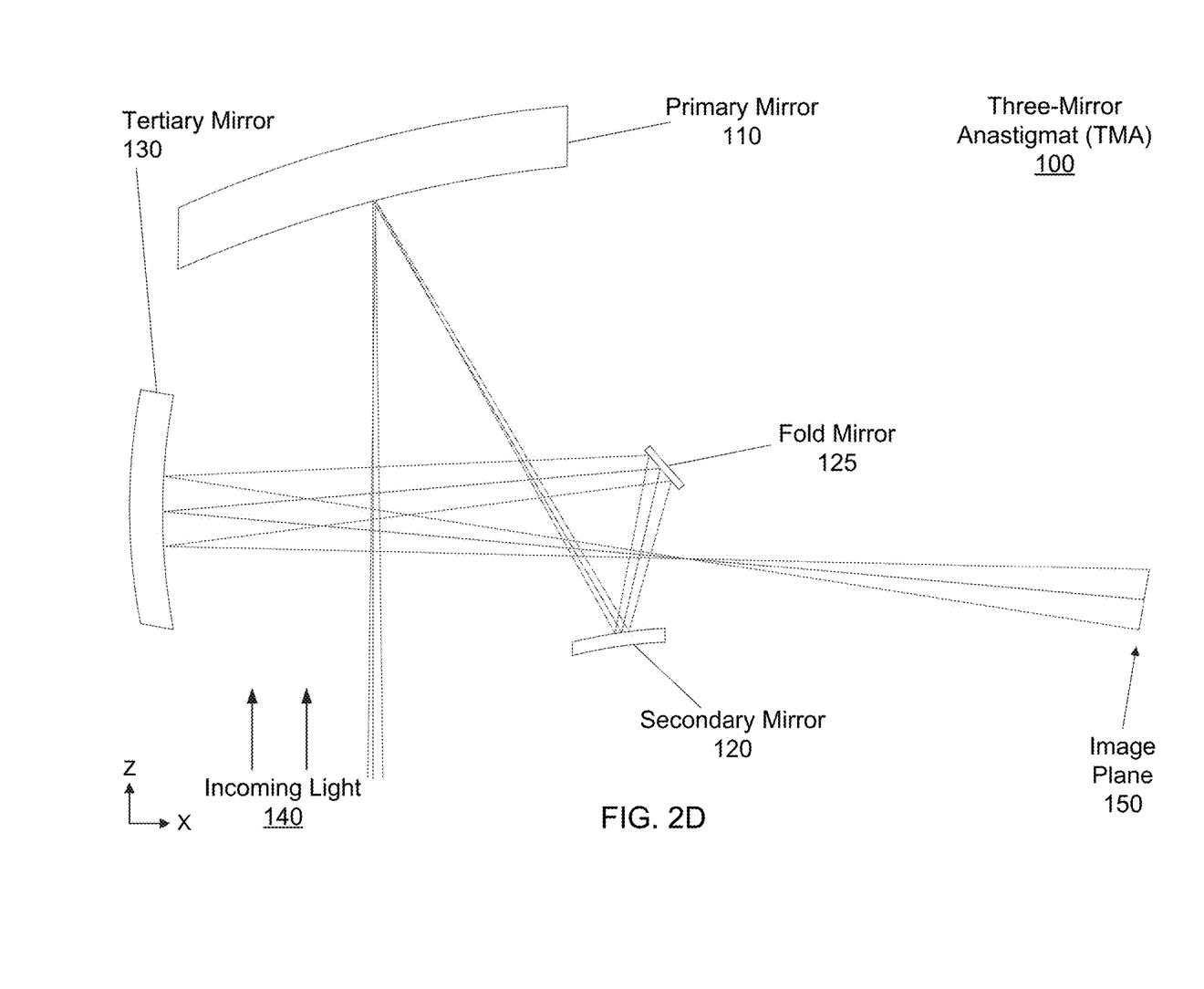
Figure 2E:
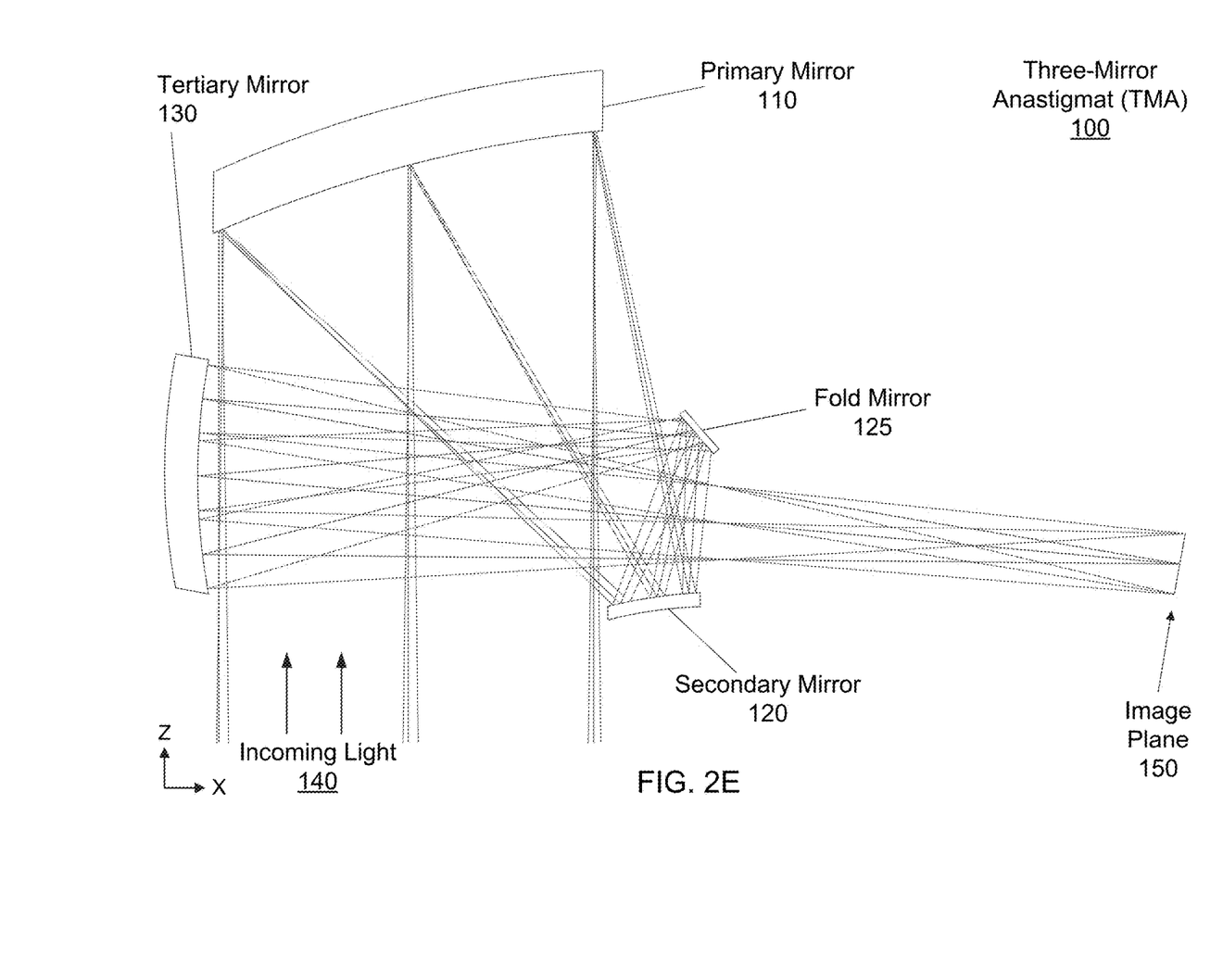

In FIG. 2A, only a single light ray path 190 is illustrated, the light ray coming from the center of the field of view and entering the middle of the light opening 160 (see FIG. 1). The light ray focuses on the center of the image plane 150. FIG. 2B is similar to FIG. 2A, only there are two light ray paths 190, each also coming from the center of the field of view, but this time entering from ends of the light opening 160. They too focus on the center of the image plane 150. FIG. 2C is a composite of FIGS. 2A and 2B, illustrating all three light ray paths 190 of FIGS. 2A-2B. FIG. 2D also illustrates three light ray paths 190, only this time they represent the left, center, and right portions of the field of view, and they enter from the center of the light opening 160. These three light rays focus on three different corresponding portions (left, center, and right) of the image plane 150. FIG. 2E is similar to FIG. 2D, only nine light ray paths 190 are illustrated, three groups of three light ray paths 190 apiece, each group having light ray paths 190 representing the left, center, and right portions of the field of view, each group entering from the center or one of the two ends of the light opening 160. These too focus on three different corresponding portions (left, center, and right) of the image plane 150.

Figure 3:
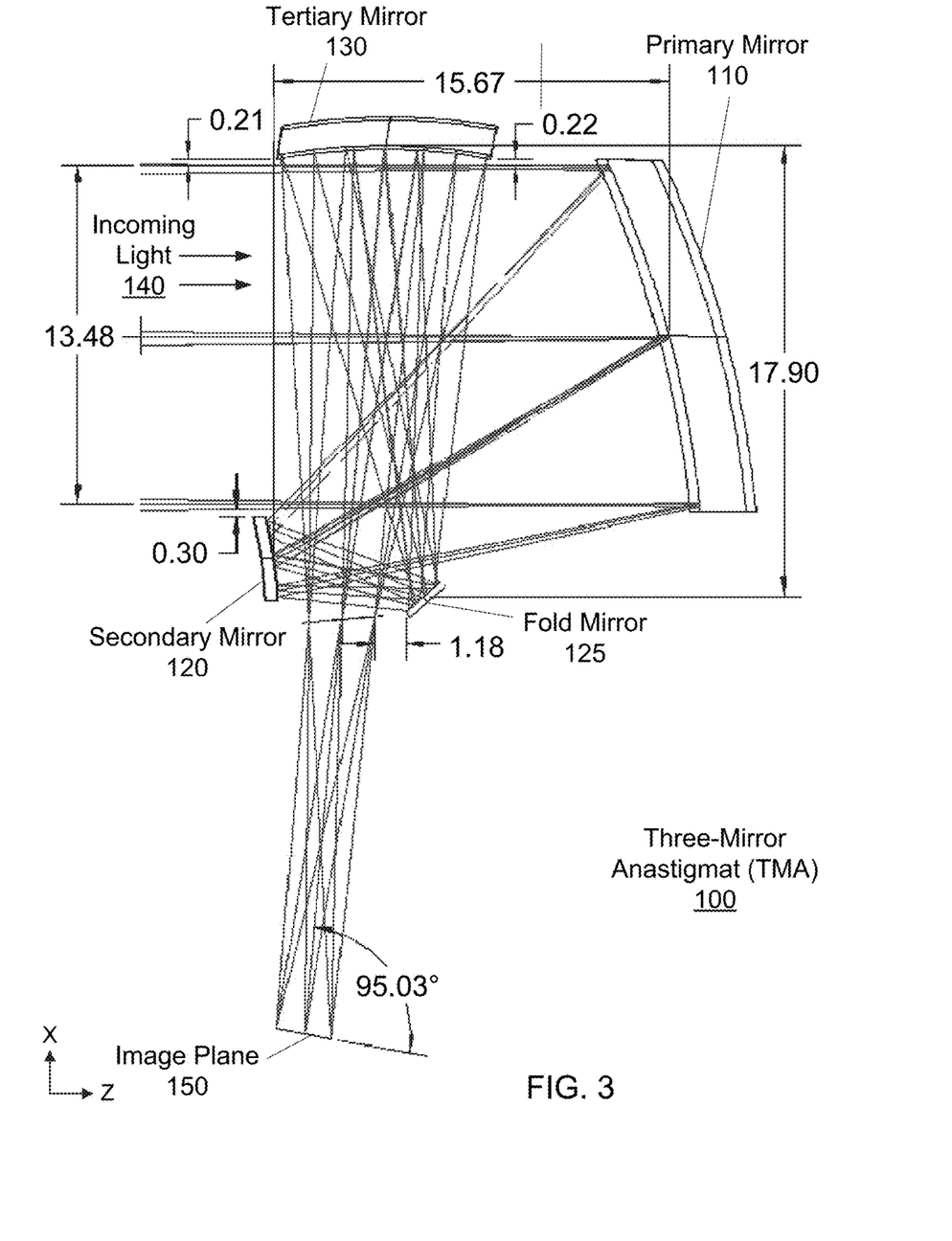
FIG. 3 is a cross-section view of example dimensions of the TMA of FIG. 1, according to an embodiment of the present disclosure.
Figure 4:
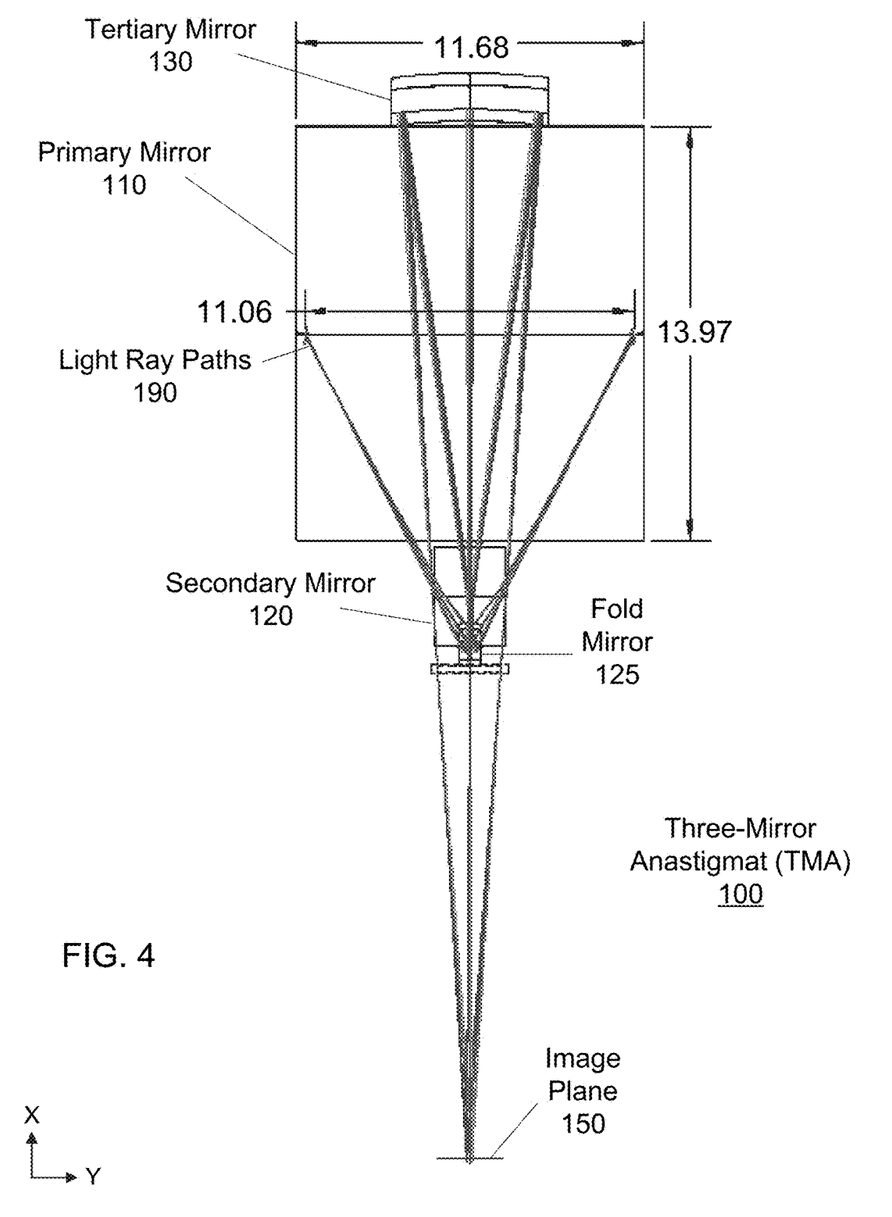
FIG. 4 is a cross-section view of example dimensions of the TMA of FIG. 3, according to an embodiment of the present disclosure.

FIG. 3 is a cross-section (Z-X) view of example dimensions of the TMA 100 of FIG. 1, according to an embodiment of the present disclosure. FIG. 4 is a cross-section (Y-X) view of example dimensions of the TMA 100 of FIG. 3, according to an embodiment of the present disclosure. In FIGS. 3-4, the optical components of FIGS. 1-2E are shown, including primary mirror 110, secondary mirror 120, fold mirror 125, tertiary mirror 130, and image plane 150, together with example dimensions (in inches) of different components and clearances. FIG. 3 also illustrates incoming light ray paths (entering the incoming light 140) similarly to FIG. 2E while FIG. 4 illustrates numerous light ray paths 190 reflecting off the primary mirror 110 (e.g., at midpoints and endpoints of the two axes bisecting the primary mirror 110), and further off the secondary mirror 120, fold mirror 125, tertiary mirror 130, and focusing at the image plane 150. The symmetry of the Y-direction is also apparent from FIG. 4, while the asymmetry of the X- and Z-directions is apparent from FIG. 3.

Figure 5:
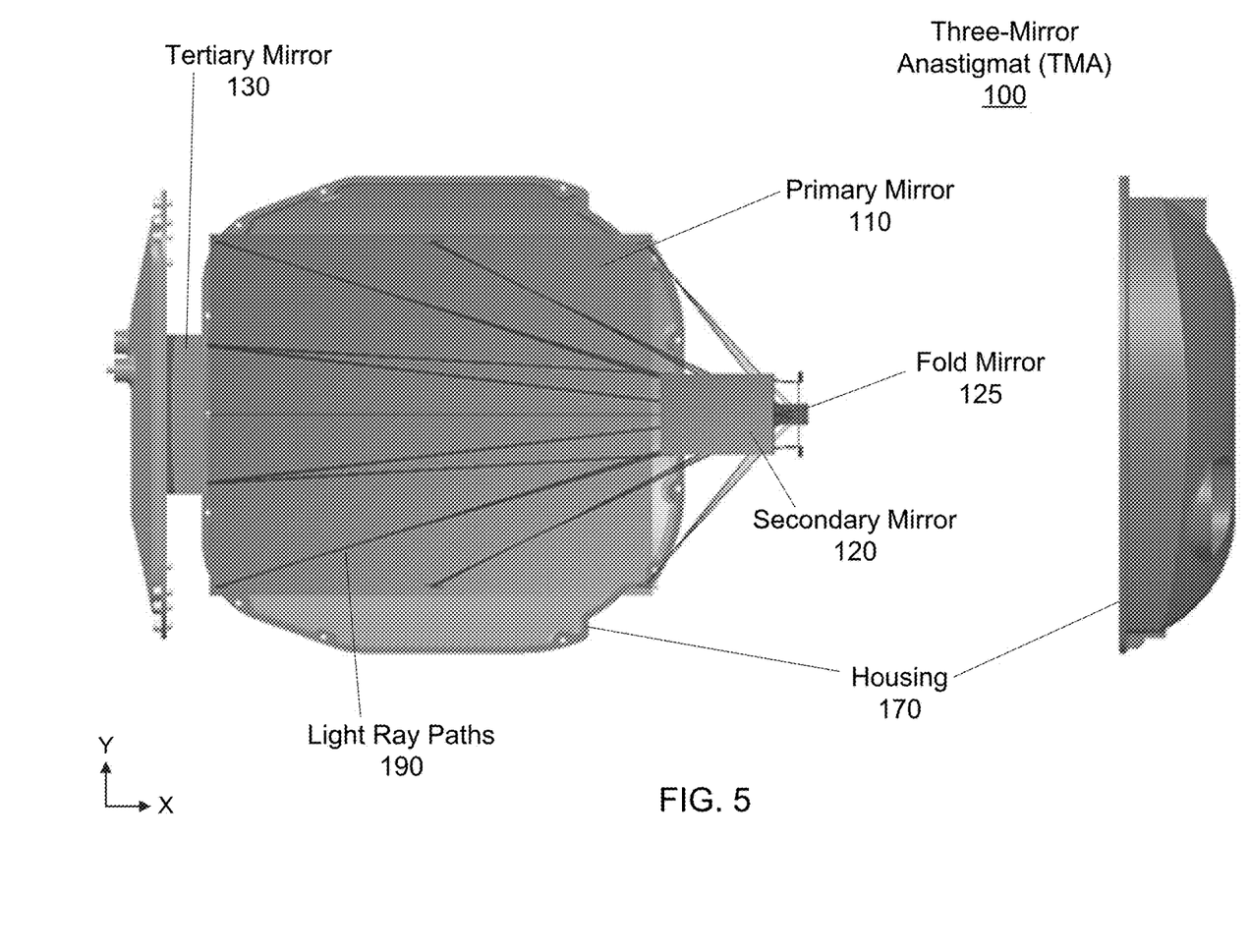
FIG. 5 is a cutaway view of the TMA of FIG. 1, according to an embodiment of the present disclosure.

FIG. 5 is a cutaway (X-Y) view of the TMA 100 of FIG. 1, according to an embodiment of the present disclosure. In FIG. 5, the TMA 100 is seen from the bottom, the light opening in the housing 170 corresponding to the primary mirror 110. FIG. 5 is a cutaway view, with much of the housing 170 not illustrated, but endcaps and portions surrounding the light opening are shown. As such, the secondary mirror 120, fold mirror 125, and tertiary mirror 130 are also shown, as are example light ray paths 190 reflecting off the primary mirror 110 and then the secondary mirror 120, fold mirror 125, and tertiary mirror 130.

Figure 6:
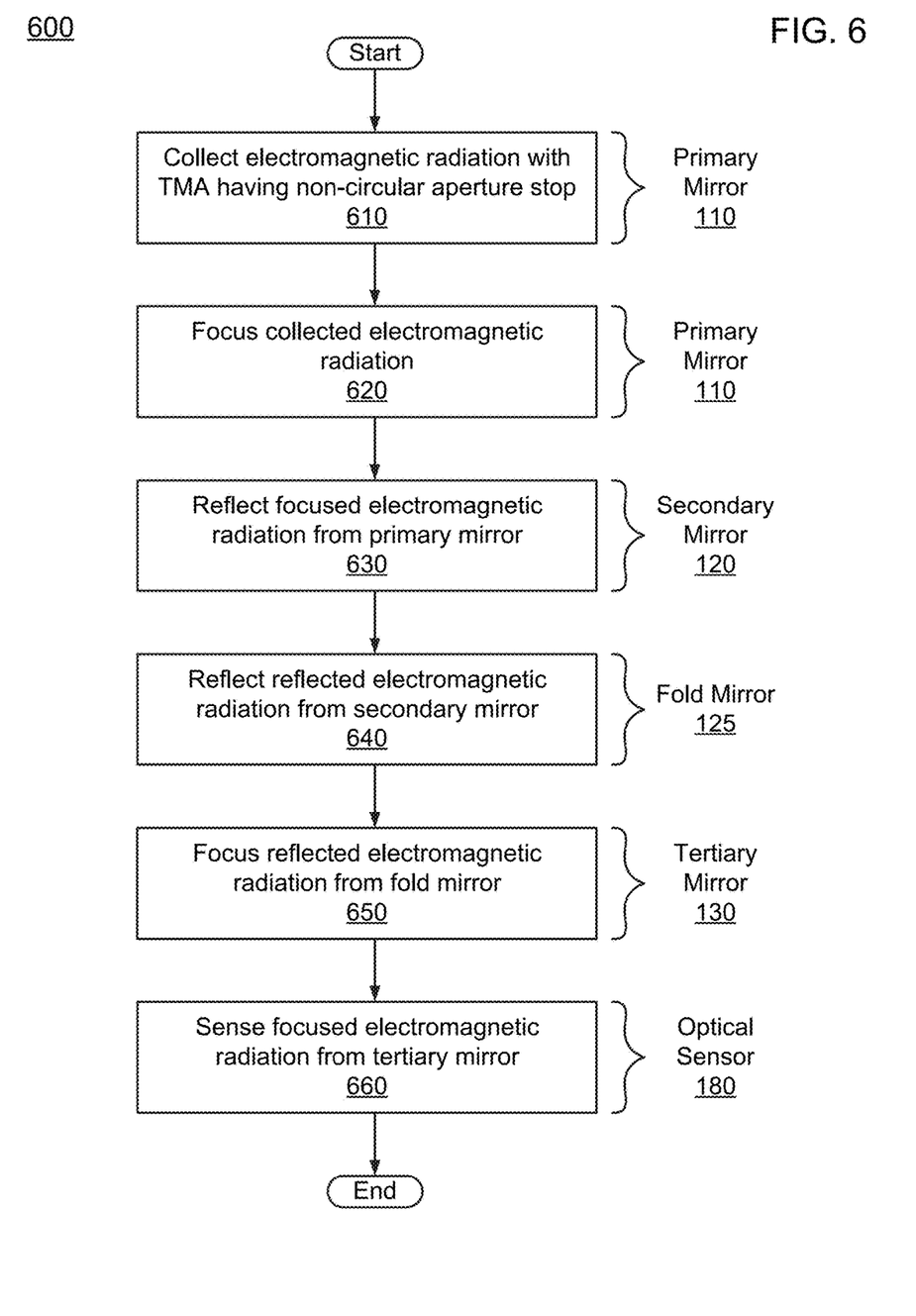
FIG. 6 is a flowchart illustrating an example method of remote sensing using a TMA and an optical sensor, according to an embodiment of the present disclosure.

FIG. 6 is a flowchart illustrating an example method 600 of remote sensing using a TMA and an optical sensor, according to an embodiment of the present disclosure. As can be seen, example method 600 includes a number of phases and sub-processes, the sequence of which may vary from one embodiment to another. However, when considered in the aggregate, these phases and sub-processes form processes for performing remote sensing using a TMA and an optical sensor, according to some embodiments of the present disclosure. These embodiments can be implemented, for example using the TMA 100 and optical sensor 180 illustrated in FIGS. 1-5 as described above. However, other system architectures can be used in other embodiments, as will be apparent in light of this disclosure. To this end, the correlation of the various functions shown in FIG. 6 to the specific components illustrated in FIGS. 1-5 is not intended to imply any structural or use limitations. Rather, other embodiments may include, for example, varying degrees of integration wherein multiple functionalities are effectively performed by one system. Numerous variations and alternative configurations will be apparent in light of this disclosure.

The method 600 of FIG. 6 uses a TMA (such as TMA 100 in FIGS. 1-5) and an optical sensor (such as optical sensor 180 in FIGS. 1-5). The TMA includes a concave primary mirror (such as primary mirror 110 of FIGS. 1-5) to collect and focus electromagnetic radiation (such as incoming light 140 of FIGS. 1-5), a curved secondary mirror (such as secondary mirror 120 of FIGS. 1-5) to reflect the electromagnetic radiation focused by the primary mirror, a flat fold mirror (such as fold mirror 125 of FIGS. 1-5) to reflect the reflected electromagnetic radiation reflected by the secondary mirror, and a concave tertiary mirror (such as tertiary mirror 130 of FIGS. 1-5) to focus the electromagnetic radiation reflected by the fold mirror. The TMA has a non-circular aperture stop (such as a rectangular aperture stop) controlling a corresponding optical path through the TMA. The optical path is unobscured by the primary, secondary, fold, and tertiary mirrors.

As illustrated in FIG. 6, in one embodiment, the method 600 of remote sensing using a TMA and an optical sensor commences with collecting 610, by the primary mirror, the electromagnetic radiation. The electromagnetic radiation can enter the TMA through the light opening (such as the light opening 160 of FIGS. 1-5). For example, the field of view of the TMA can be framed by the light opening on the primary mirror (e.g., the reflective portion of the primary mirror, or the reflective portion of the primary mirror configured to reflect light rays from the field of view to the secondary mirror). In one embodiment, the primary mirror defines the aperture stop, with the aperture stop taking on the shape of the reflective portion of the primary mirror. The remainder of the optical path is unobscured by any components in the TMA (such as the components within a housing of the TMA, such as housing 170 of FIGS. 1-5), and directs the light rays in the field of view and reflected off the primary mirror to further optical elements before reaching an image plane (such as the image plane 150 of FIGS. 1-5). For instance, the primary mirror can be rectangular (such as a rectangle having a width-to-length ratio of 0.8) and defines a rectangular aperture stop of the same proportions.

Continuing with the method 600, the primary mirror focuses 620 the collected electromagnetic radiation to the secondary mirror. The secondary mirror reflects 630 the focused electromagnetic radiation from the primary mirror to the fold mirror. The fold mirror reflects 640 the reflected electromagnetic radiation from the secondary mirror to the tertiary mirror. The tertiary mirror focuses 650 the reflected electromagnetic radiation from the secondary mirror to the optical sensor. For example, the tertiary mirror can focus the electromagnetic radiation to an image plane or focal plane that is part of or near the optical sensor. In some embodiments, the focal length of the optical path, when divided by the entrance pupil diameter (or equivalent measurement, given the non-circular aperture stop) yields an f-number between 6.2 and 6.5. For instance, in one embodiment, the f-number of the TMA is 6.2. The optical sensor senses 660 the focused electromagnetic radiation from the tertiary mirror.

In one embodiment, the optical sensor includes a spectrometer, and the method 600 further includes dispersing, by a refractive (e.g., prism) or diffractive (e.g., diffraction grating) element, the focused electromagnetic radiation from the tertiary mirror. The method 600 further includes sensing the dispersed electromagnetic radiation by the spectrometer. In another embodiment, the optical sensor includes a camera, and the method 600 further includes imaging the focused electromagnetic radiation by the camera.

Numerous specific details have been set forth herein to provide a better understanding of the embodiments. It will be understood by an ordinarily-skilled artisan, however, that the embodiments may be practiced without these specific details. In other instances, well known operations, components, and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is an off-axis optical system having a rectangular aperture stop to control rays of incident electromagnetic radiation passing through the optical system along an optical path. The optical system includes one or more optical surfaces along the optical path, each surface being configured to change a direction of each ray on the surface based on a location of the ray relative to the surface. At least one of the surfaces is conjugate to and has a same shape as the rectangular aperture stop.

Example 2 includes the subject matter of Example 1, where each optical surface is shaped to avoid vignetting the rays.

Example 3 includes the subject matter of Example 1, where the optical path is unobscured by the optical surfaces.

Example 4 includes the subject matter of Example 3, where the optical surfaces are reflective.

Example 5 includes the subject matter of Example 4, where the optical system is a three-mirror anastigmat.

Example 6 includes the subject matter of Example 5, where the optical surfaces include a concave primary mirror to collect and focus the electromagnetic radiation, a curved secondary mirror to reflect the electromagnetic radiation focused by the primary mirror, and a concave tertiary mirror to focus the electromagnetic radiation reflected by the secondary mirror.

Example 7 includes the subject matter of Example 6, where the primary mirror is conjugate to and has the same shape as the rectangular aperture stop.

Example 8 includes the subject matter of Example 7, where the secondary mirror is convex.

Example 9 includes the subject matter of Example 8, where the optical surfaces further include a fold mirror to reflect the electromagnetic radiation reflected by the secondary mirror to the tertiary mirror.

Example 10 is a remote sensing device including the optical system of claim 9 and an optical sensor to sense the focused electromagnetic radiation from the tertiary mirror.

Example 11 is a three-mirror anastigmat (TMA) including a concave primary mirror to collect and focus electromagnetic radiation, a curved secondary mirror to reflect the electromagnetic radiation focused by the primary mirror, and a concave tertiary mirror to focus the electromagnetic radiation reflected by the secondary mirror. The TMA has a non-circular aperture stop. An optical path through the TMA as controlled by the non-circular aperture stop is unobscured by the primary, secondary, and tertiary mirrors.

Example 12 includes the subject matter of Example 11, where the secondary mirror is convex.

Example 13 includes the subject matter of Example 11, further including a fold mirror to reflect the electromagnetic radiation reflected by the secondary mirror to the tertiary mirror, where the optical path is further unobscured by the fold mirror.

Example 14 includes the subject matter of Example 11, where the primary mirror is conjugate to and has a same shape as the non-circular aperture stop.

Example 15 includes the subject matter of Example 14, where the primary mirror is rectangular.

Example 16 includes the subject matter of Example 15, where the rectangular primary mirror has a width-to-length ratio of between 0.76 and 0.84.

Example 17 is a method of remote sensing using a three-mirror anastigmat (TMA) and an optical sensor. The TMA includes a concave primary mirror to collect and focus electromagnetic radiation, a curved secondary mirror to reflect the electromagnetic radiation focused by the primary mirror, and a concave tertiary mirror to focus the electromagnetic radiation reflected by the secondary mirror. The TMA has a non-circular aperture stop controlling a corresponding optical path through the TMA. The optical path is unobscured by the primary, secondary, and tertiary mirrors.

The method includes: collecting, by the primary mirror, the electromagnetic radiation; focusing, by the primary mirror to the secondary mirror, the collected electromagnetic radiation; reflecting, by the secondary mirror to the tertiary mirror, the focused electromagnetic radiation from the primary mirror; focusing, by the tertiary mirror to the optical sensor, the reflected electromagnetic radiation from the secondary mirror; and sensing, by the optical sensor, the focused electromagnetic radiation from the tertiary mirror.

Example 18 includes the subject matter of Example 17, where the TMA further includes a flat fold mirror not obscuring the optical path, and the reflecting of the focused electromagnetic radiation includes reflecting, by the fold mirror to the tertiary mirror, the reflected electromagnetic radiation from the secondary mirror.

Example 19 includes the subject matter of Example 17, where the optical sensor includes a spectrometer, the method further includes dispersing, by a refractive or diffractive element, the focused electromagnetic radiation from the tertiary mirror, and the sensing of the focused electromagnetic radiation includes sensing, by the spectrometer, the dispersed electromagnetic radiation.

Example 20 includes the subject matter of Example 17, where the optical sensor includes a camera, and the sensing of the focused electromagnetic radiation includes imaging, by the camera, the focused electromagnetic radiation.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. An off-axis three-mirror anastigmat having a rectangular aperture stop to control rays of incident electromagnetic radiation passing through the three-mirror anastigmat along an optical path, the three-mirror anastigmat comprising:
    three or more reflective surfaces along the optical path, each surface being configured to change a direction of each ray on the surface based on a location of the ray relative to the surface, at least one of the surfaces being conjugate to and having a same shape as the rectangular aperture stop,
    wherein the rectangular aperture stop has a width-to-length ratio of between 0.76 and 0.84, and
    wherein the at least one of the surfaces comprises a concave primary mirror to collect and focus the electromagnetic radiation.

2. The three-mirror anastigmat of claim 1, wherein each reflective surface is shaped to avoid vignetting the rays.

3. The three-mirror anastigmat of claim 1, wherein the optical path is unobscured by the reflective surfaces.

4. The three-mirror anastigmat of claim 1, wherein the reflective surfaces further comprise:
    a curved secondary mirror to reflect the electromagnetic radiation focused by the primary mirror; and
    a concave tertiary mirror to focus the electromagnetic radiation reflected by the secondary mirror.

5. The three-mirror anastigmat of claim 4, wherein the secondary mirror is convex.

6. The three-mirror anastigmat of claim 5, wherein the reflective surfaces further comprise a fold mirror to reflect the electromagnetic radiation reflected by the secondary mirror to the tertiary mirror.

7. A remote sensing device comprising the three-mirror anastigmat of claim 6 and an optical sensor to sense the focused electromagnetic radiation from the tertiary mirror.

8. A three-mirror anastigmat (TMA) comprising:
    a concave rectangular primary mirror to collect and focus electromagnetic radiation, the rectangular primary mirror having a width-to-length ratio of between 0.76 and 0.84;
    a curved secondary mirror to reflect the electromagnetic radiation focused by the primary mirror; and
    a concave tertiary mirror to focus the electromagnetic radiation reflected by the secondary mirror,
    wherein the TMA has a rectangular aperture stop, the rectangular primary mirror is conjugate to and has a same shape as the rectangular aperture stop, and an optical path through the TMA as controlled by the rectangular aperture stop is unobscured by the primary, secondary, and tertiary mirrors.

9. The TMA of claim 8, wherein the secondary mirror is convex.

10. The TMA of claim 8, further comprising a fold mirror to reflect the electromagnetic radiation reflected by the secondary mirror to the tertiary mirror, wherein the optical path is further unobscured by the fold mirror.

11. A method of remote sensing using a three-mirror anastigmat (TMA) and an optical sensor, the TMA including a concave rectangular primary mirror to collect and focus electromagnetic radiation, a curved secondary mirror to reflect the electromagnetic radiation focused by the primary mirror, and a concave tertiary mirror to focus the electromagnetic radiation reflected by the secondary mirror, the TMA having a rectangular aperture stop controlling a corresponding optical path through the TMA, the rectangular primary mirror having a width-to-length ratio of between 0.76 and 0.84, the rectangular primary mirror being conjugate to and having a same shape as the rectangular aperture stop, the optical path being unobscured by the primary, secondary, and tertiary mirrors, the method comprising:
    collecting, by the primary mirror, the electromagnetic radiation;
    focusing, by the primary mirror to the secondary mirror, the collected electromagnetic radiation;
    reflecting, by the secondary mirror to the tertiary mirror, the focused electromagnetic radiation from the primary mirror;
    focusing, by the tertiary mirror to the optical sensor, the reflected electromagnetic radiation from the secondary mirror; and
    sensing, by the optical sensor, the focused electromagnetic radiation from the tertiary mirror.

12. The method of claim 11, wherein
    the TMA further includes a flat fold mirror not obscuring the optical path, and the reflecting of the focused electromagnetic radiation comprises reflecting, by the fold mirror to the tertiary mirror, the reflected electromagnetic radiation from the secondary mirror.

13. The method of claim 11, wherein
the optical sensor comprises a spectrometer,
the method further comprises dispersing, by a refractive or diffractive element, the focused electromagnetic radiation from the tertiary mirror, and
the sensing of the focused electromagnetic radiation comprises sensing, by the spectrometer, the dispersed electromagnetic radiation.

14. The method of claim 11, wherein
the optical sensor comprises a camera, and
the sensing of the focused electromagnetic radiation comprises imaging, by the camera, the focused electromagnetic radiation.

\* \* \* \* \*